March 25, 1958 | J. H. SIBBET | 2,828,367

PHONO-TAPE TRANSPORT MECHANISM

Filed July 2, 1953 | 2 Sheets-Sheet 1

JAMES H. SIBBET,
INVENTOR.

BY Donald L. Ryer

AGENT.

March 25, 1958 J. H. SIBBET 2,828,367

PHONO-TAPE TRANSPORT MECHANISM

Filed July 2, 1953 2 Sheets-Sheet 2

JAMES H. SIBBET,
INVENTOR.

BY Donald L. Ryan

AGENT.

United States Patent Office 2,828,367

Patented Mar. 25, 1958

2,828,367

PHONO-TAPE TRANSPORT MECHANISM

James H. Sibbet, Pasadena, Calif.

Application July 2, 1953, Serial No. 365,676

17 Claims. (Cl. 179—100.2)

The present invention relates generally to a magnetic recording device, and relates more particularly to a magnetic recording device adapted for use in connection with a standard phonograph or like mechanisms.

As mechanisms for recording sound have progressed over the years, many new developments have been made, some of these developments naturally obsoleting prior devices with the advent of more dependable, versatile, accurate and variable speed machines. Currently, a large proportion of individuals and families possess phonographs or other like devices for reproducing and/or recording sound on discs or the like. With the advent of magnetic recording devices utilizing either wire or a magnetic tape, individuals and families have found it often too expensive to convert to this new medium by purchase of an entirely new machine. It is also the desire to maintain existing phonographs and other disc type recording and transcribing devices and to be able to convert these devices for the more advanced recording mediums in such a manner as to enable interchangeable use of recording mediums and associated conservation of space, due to the use of a single composite machine.

It is, therefore, an important object of the present invention to provide a magnetic recording and playback device that may be utilized in association with a standard phonograph or the like.

It is another object of the present invention to provide a novel recording medium transport mechanism that may be adapted for use with a phonograph or the like.

It is a further important object of the present invention to provide a novel means for propelling a recording medium through a required transition path to enable recording and/or transcribing of sound therefrom.

It is a still further important object of the present invention to provide a novel means for driving a recording medium transport mechanism.

It is another object of the present invention to provide a novel means for incorporating the driving means for a recording medium transport mechanism, and reels for carrying the recording medium, on a single spindle, and to provide means for transporting the recording medium from one level to another level commensurate with proper reeling and unreeling thereof.

It will be seen that the present invention has other objects, advantages and features, some of which, with the foregoing, will be set forth in the following description in which certain embodiments of the invention have been selected for illustrative purposes only in the drawings, accompanying and forming a part of the present specification, and wherein:

Fig. 3 is a fragmentary view, partially schematic, and showing the magnetic recording mechanism to be attached to a phonograph or the like;

Fig. 4 is a side elevational view of the mechanism shown in Fig. 3 as taken substantially as indicated by line 4—4, Fig. 3;

Fig. 5 is a transverse sectional view of the spindle and mounting arrangement thereon as taken substantially as indicated by line 5—5, Fig. 3;

Fig. 6 is an enlarged fragmentary sectional view showing a pressure foot associated with a magnetic recording head as utilized in the present invention; and Fig. 7 is an enlarged perspective view of a recording medium guide member as utilized in the present invention to transport the recording medium from one level to another.

While the present invention will be shown and described in connection with a mechanism utilizing a magnetic tape as a recording medium, it is to be expressly understood that the invention may be applied and adapted for use with other types of recording media, such as for example, wire or the like.

Figure 1:
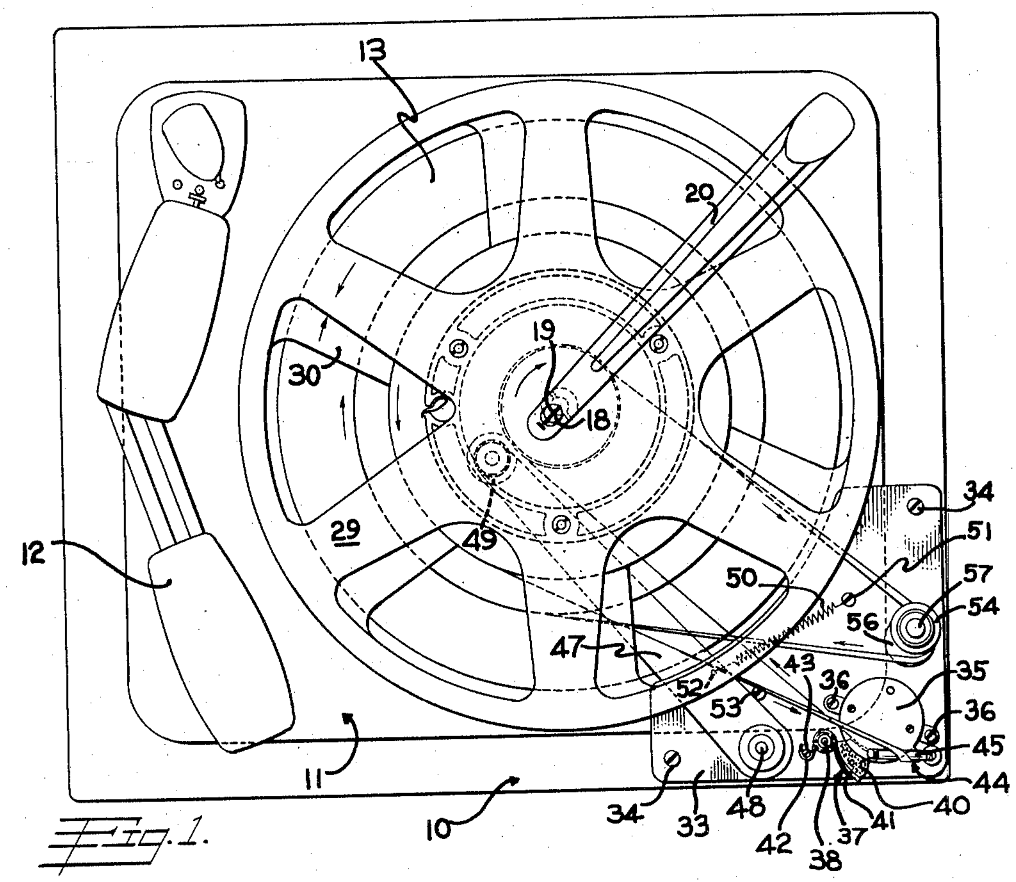
Fig. 1 is a plan view of the recording medium transport mechanism of the present invention shown in association with a standard phonograph.
Figure 2:
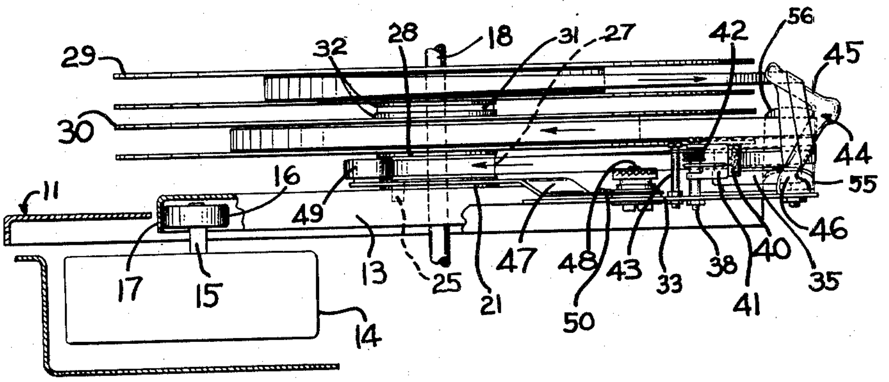
Fig. 2 is a side elevation view of the device of Fig. 1.

With reference primarily to Figs. 1 and 2 of the drawings, the present invention is shown as being attached to and associated with a phonograph or the like, indicated generally at 10, it being understood that the unit shown is merely one example of many available types of phonographs. As shown, the phonograph 10 includes a centrally supported normally horizontally disposed frame structure 11 that is adapted to support a suitable arm 12 that may be utilized for recording or transcribing disc type recording devices. The arm 12 forms no part of the present invention but is included to more clearly illustrate the setting for the present device. A turntable 13 is rotatably supported, in any suitable manner, in the frame structure 11, the turntable being adapted to be driven by means of a motor 14. The motor 14 has a driveshaft 15 and a friction roller 16, the roller being adapted to engage the inner surface of a downwardly turned flange 17 formed from the periphery of the turntable 13. A spindle 18, of the usual design, is adapted to extend upwardly from the axis of the turntable 13, the spindle 18 having the customary outwardly extending arm portion 19 for the locking of disc type records or the like thereon. The upper end of the spindle 18 is adapted to be supported and guided by an arm 20, extending inwardly from the periphery of the frame structure 11 in a manner utilized in most contemporary phonographs.

Figures 3, 4, 5, 6, 7:
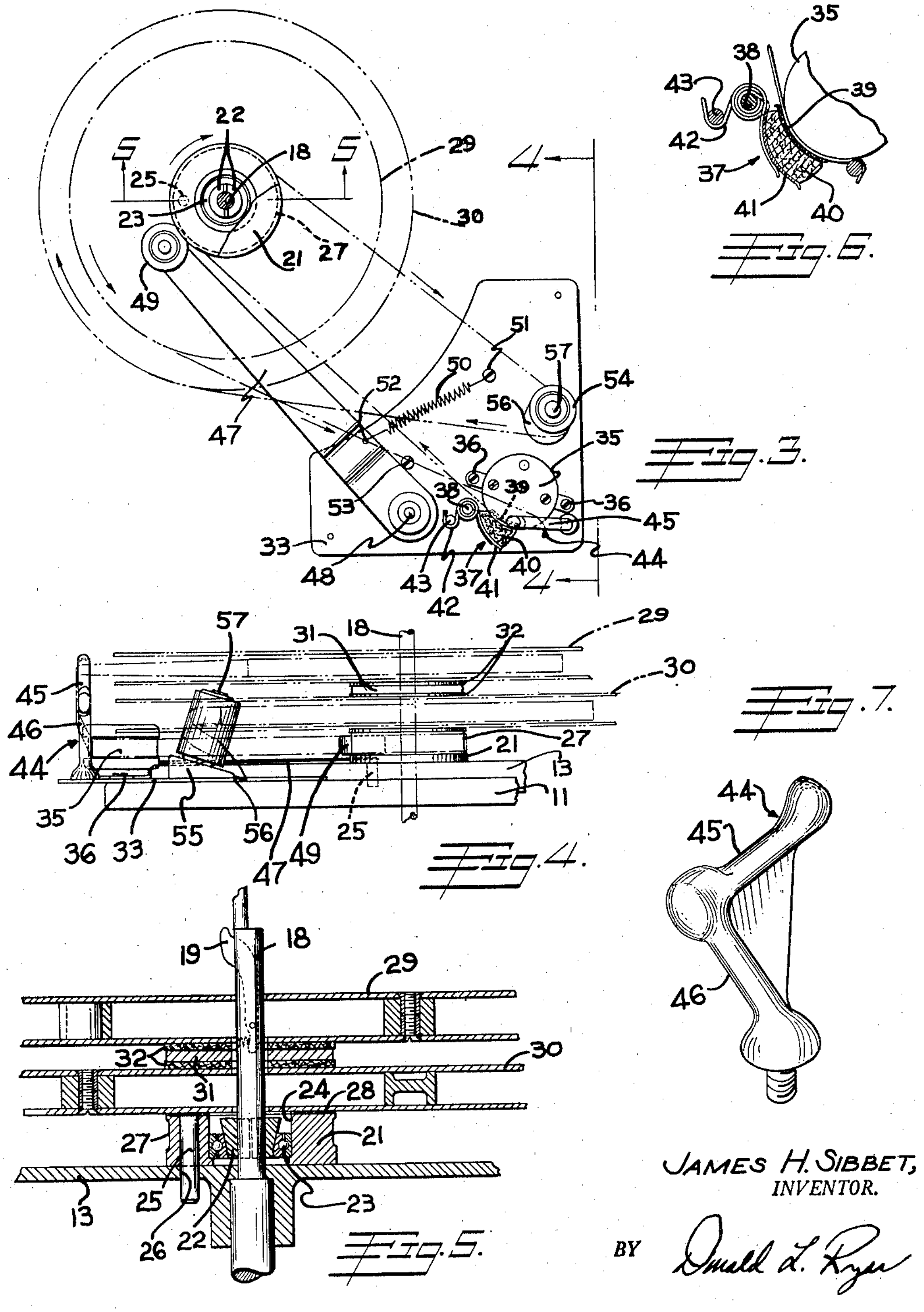

With reference primarily to Figs. 2, 3, and 5, a capstan 21 is adapted to be disposed on the spindle 18 in rotatable relationship thereto. In order to assure positive alignment of the capstan with the spindle 18, a split collet member 22 is adapted to engage the spindle 18, the outer surface thereof being adapted to engage a bearing 23, the bearing being secured in a centrally disposed bore 24 formed in the capstan 21. A locating and driving pin 25 extends downwardly from the capstan 21 and is adapted to be secured in an opening 26 formed in the turntable 13 adjacent the axis thereof, to thereby insure positive driving of the capstan by the turntable 13. The outer surface of the capstan 21 is provided with a peripheral groove 27 to serve as a guide for the recording tape medium in a manner to be hereinafter more fully described. The upper surface of the capstan is provided with a layer of frictional material 28 such as, for example, leather or the like.

A pair of reels 29 and 30 are adapted to be placed in axial alignment on the spindle 18, the lower surface of the reel 30 being adapted to engage the frictional layer 28 formed on the upper surface of the capstan 21. The capstan and the frictional layer 28 act to drive the reel 30 by frictional engagement therewith in a manner and at a speed commensurate with that necessary for the proper reeling of the recording medium thereon, this speed being variable due to the relative diameter of the reeled material. A spacer member 31 is positioned about the spindle 18 intermediate the reels 29 and 30, the spacer member being provided with suitable disc like friction coverings 32 on the upper and lower surface thereof, these coverings being of felt, for example. The coverings 32 may be impregnated with a light oil or the like, the purpose of which to be hereinafter more fully described.

For purposes of illustration and discussion, the reel 29 will be hereinafter referred to as a stock reel and the reel 30 will be referred to as a takeup reel.

In order to support the necessary additional equipment required for magnetic recording, a plate 33 is secured to the upper surface of the phonograph 10 and the frame structure 11 by means of suitable screws 34 or the like, this plate being adapted to support the required mechanism previously referred to. As shown primarily in Figs. 1, 2 and 3, the mechanism secured to the plate 33 comprises a magnetic recording head 35 which may be of any suitable type and secured to the plate 33 by means of suitable screws 36. A pressure foot, indicated generally at 37, Fig. 6, is pivotally mounted on a pin 38 extending upwardly from the plate 33, and has a portion 39 of felt or the like that is adapted to normally engage the outer surface of the recording head 35, there being a resilient body portion 40 secured intermediate the felt portion 39 and a backing portion 41. A spring 42 is adapted to extend about the pin 38 and engage the outer surface of the backing plate 41, the other end thereof being adapted to be anchored by means of a pin 43, also extending upwardly from the plate 33. The backing plate 41 may be referred to as a mu shield and is generally constructed from a suitable magnetic material in order to reduce the amount of audible hum that may be transmitted to the recording medium.

A multilevel guide member 44, Fig. 7, is mounted on the plate 33 and has a horizontally extending surface 45 and an angularly disposed surface 46 so as to guide the recording medium from one level to another as may be necessary for proper reeling and unreeling thereof.

In order to insure proper engagement of the recording medium in the groove 27 formed on the outer periphery of the capstan 21, a pressure arm 47 is pivoted as at 48 to the plate 33, the inner end of the arm 47 pivotally carrying a roller 49 that is adapted to normally engage in the groove 27. A tension spring 50 secured to the plate 33 as at 51, and to the arm 47 as at 52, normally urges the arm 47 and the roller 49 into engagement with the capstan 21. A stop pin 53 limits inward movement of the pressure arm 47.

A guide roller 54 which may be mounted on an upwardly extending angularly disposed boss 55, extending upwardly from the plate 33, is disposed adjacent the recording head 35 and provided with a resilient outer surface 56. The roller 55 is mounted on a suitable shaft 57 that is secured to the plate 33 through the axis of the boss 55.

In preparing the present device for either recording or transcription of material contained on a recording tape, the stock reel 29, that is normally adapted to initially carry a supply of recording tape, is positioned above the takeup reel 30, the takeup reel being on contact with the upper surface of the capstan 21. The recording tape is adapted to extend outwardly from the stock reel 29, over the surface 45 of the guide member 44, and about the surface 46 of the guide member 44 to thereby place the tape in a position and at a level to be passed intermediate the pressure foot 37 and the magnetic recording head 35. From the head 35, the magnetic tape extends about the capstan 21, by way of the peripheral groove 27, and outwardly over the roller 54 to thereafter extend to the takeup reel 30. As previously described, the magnetic tape is retained in contact with the capstan 21 by means of the pressure arm 47 and the roller 49. In this connection, it is to be understood that, in certain instances, the pressure arm 47 and roller 49 may be eliminated by the application of a suitable frictional material to the outer driving surface of the capstan 21, to enable frictional contact intermediate the recording medium and the capstan.

Upon starting the motor 14, the turntable 13 will be rotated, thus rotating the capstan 21 and the takeup reel 30. It is evident that there will always be some slippage intermediate the takeup reel 30 and the surface of the capstan 21 inasmuch as the diameter of the reeled material on the takeup reel 30 always exceeds that of the capstan 21, the rotation of the reel 30 being in a direction to always maintain a constant tension on the recording tape as it is delivered thereto from the guide roller 54. The magnetic tape is withdrawn from the stock reel 29 by means of the force transmitted thereto from the capstan 21, there being a slight frictional drag intermediate the reels 29 and 30, due to the spacer 31, and the lubricated coverings thereon. The normal tendency would be for the reel 29 to rotate in the same direction as the reel 30; however, it may be seen that, when the recording material is being withdrawn from the reel 29, this reel must rotate in a direction counterclockwise to that of the reel 30, to thereby maintain a slight resistance to the withdrawal of the material from this stock reel and to insure the proper unreeling of the material therefrom over the surfaces 45 and 46 of the guide member 44 and, from this point, over the appropriate surface of the magnetic recording head 35 intermediate this recording head and the pressure foot 37.

It may thus be seen that the present invention may be applied to and incorporated with a standard phonograph to recording and/or transcription of sound on or from any suitable magnetic recording material such as for example, tape or wire. It may also be seen that the device herein disclosed may be applied to and adapted for use with a standard phonograph in such a manner as to render installation thereof relatively simple and use in connection therewith highly efficient to thus provide a compact device that may be operated by persons unskilled in the field of complex magnetic recording equipment.

For the transcription of sound carried by the magnetic recording tape of the present invention, it is obviously necessary that a suitable amplifier be utilized, such as, for example, the amplifier used with the standard phonograph, or any other separate amplifier or preamplifying device, such utilization with amplifiers being well known and understood by those persons skilled in the art.

From the foregoing description, the uses, advantages, and operation of the present invention will be readily understood by those skilled in the art to which the invention appertains. While there has been described certain embodiments of the invention, it is desired to emphasize the fact that the invention may be applied to various types of recording devices and recording medium transport mechanisms, to have it understood that the examples given are merely illustrative, and that the invention is not to be limited to the details disclosed herein but is to be accorded the full scope of the appended claims.

I claim:

1. In a recording or transcribing device: a turntable mounted for rotation; means to drive said turntable; a spindle; a capstan disposed on said spindle and mounted for rotation with said turntable; a pair of reels positioned in axial alignment on said spindle; a recording head; and means to progressively transport a magnetic recording material from one of said reels, over said recording head, about said capstan and onto the other of said reels.

2. In a combination recording and playback device: a turntable mounted for rotation; means to drive said turntable; a spindle; a capstan disposed on said spindle and mounted for rotation with said turntable; a pair of reels positioned in axial alignment on said spindle, one of said reels being adapted to be driven by said capstan; a combination recording and playback head; and means to progressively transport a magnetic recording material from one of said reels, over said head, about said capstan and onto the other of said reels.

3. In a recording device; a turntable mounted for rotation; means to drive said turntable; a spindle; a capstan disposed on said spindle and mounted for rotation with said turntable; a pair of reels positioned in axial alignment on said spindle, one of said reels being a stock reel, the other being a take-up reel, said take-up reel being adapted to be frictionally driven by said capstan; a combination magnetic recording playback and erase head; and means driven by said capstan to progressively transport a magnetic recording material from said stock reel, over said head, about said capstan and onto said take-up reel.

4. In a recording medium transport mechanism: a driven turntable; a spindle disposed axially from said turntable; means disposed on said spindle and adapted to be driven by said turntable for causing movement of said recording medium; a pair of reels adapted to carry said recording medium, said reels being mounted on said spindle; a magnetic recording head; and guide means to permit transportation of said recording medium from one of said reels, over said recording head, about said means for causing movement of said recording medium and onto the other of said reels.

5. In a recording medium transport mechanism: a driven turntable; a spindle disposed axially from said turntable; means disposed on said spindle and adapted to be driven by said turntable for causing movement of said recording medium; a pair of reels adapted to carry said recording medium, said reels being mounted on said spindle; a magnetic recording head; guide means to permit transportation of said recording medium from one of said reels, over said recording head and about said means for causing movement of said recording medium; and guide means to permit transportation of said recording medium from said means for causing movement of said medium and onto the other of said reels.

6. In a recording medium transport mechanism: a driven turntable; a spindle disposed axially from said turntable; a capstan disposed on said spindle and adapted to be driven by said turntable for causing movement of said recording medium by frictional engagement therewith; a pair of reels adapted to carry said recording medium, said reels being mounted in spaced relationship on said spindle; a magnetic recording head; first guide means to permit transportation of said recording medium from one of said reels over said recording head and about said capstan; and second guide means to permit transportation of said recording medium from said capstan and onto the other of said reels.

7. In a recording medium transport mechanism: a driven turntable; a spindle disposed axially from the center of said turntable; a capstan disposed on said spindle and adapted to be driven by said turntable for causing movement of said recording medium by frictional engagement therewith; a pair of reels adapted to carry said recording medium, said reels being mounted on said spindle; a magnetic recording head; first guide means to permit transportation of said recording medium from one of said reels over said recording head and about said capstan; second guide means to permit transportation of said recording medium from said capstan and onto the other of said reels; and pressure means to maintain said recording medium in contact with said capstan and said recording head.

8. A recording tape transport mechanism for a magnetic recording device adapted for association with a phonograph, comprising, in combination: a turntable carried by said phonograph; driving means for said turntable; a spindle disposed from a central area of said turntable; a stock reel and a takeup reel adapted to be mounted for rotation on said spindle; a capstan positioned on said spindle intermediate said takeup reel and said turntable; means to drive said capstan by said turntable; frictional engagement means to drive said takeup reel by said capstan; a recording head positioned adjacent the peripheries of said reels, a guide member, said capstan being adapted to progressively withdraw magnetic recording material from said stock reel, over said guide member and said recording head, about and driven by said capstan and onto said takeup reel; and means to maintain said magnetic recording material in frictional driven contact with said capstan.

9. A recording tape transport mechanism for a magnetic recording device adapted for association with a phonograph, comprising, in combination: a turntable carried by said phonograph; driving means for said turntable; a spindle disposed from a central area of said turntable; a stock reel and a takeup reel adapted to be mounted in spaced relationship for rotation on said spindle; a capstan positioned on said spindle intermediate said takeup reel and said turntable; means to drive said capstan by said turntable; frictional engagement means to drive said takeup reel by said capstan; a recording head positioned adjacent the peripheries of said reels; a guide member, said capstan being adapted to progressively withdraw magnetic recording material from said stock reel, over said guide member and said recording head, said capstan being adapted to frictionally drive said takeup reel to withdraw said recording material from said capstan; and means to maintain said magnetic recording material in frictional driven contact with said capstan.

10. A recording tape transport mechanism for a magnetic recording device adapted for association with a phonograph, comprising, in combination: a turntable carried by said phonograph; driving means for said turntable; a spindle disposed from a central area of said turntable; a stock reel and a takeup reel adapted to be mounted in spaced relationship for rotation on said spindle; a capstan positioned on said spindle intermediate said takeup reel and said turntable; means to drive said capstan by said turntable; frictional engagement means to drive said takeup reel by said capstan; a recording head positioned adjacent the peripheries of said reels; a guide members, said capstan being adapted to progressively withdraw magnetic recording material from said stock reel, over said guide member and said recording head, said capstan being adapted to frictionally drive said takeup reel to withdraw said recording material from said capstan; means to maintain said magnetic recording material in frictional driven contact with said capstan; and guide means intermediate said capstan and said takeup reel.

11. A magnetic recording tape transport mechanism for magnetic recording and transcribing devices adapted for association with a phonograph, comprising, in combination: a turntable carried by said phonograph; driving means for said turntable; a spindle disposed from a central area of said turntable; a stock reel and a takeup reel adapted to be mounted in spaced relationship for rotation on said spindle; a friction reducing spacer disposed intermediate said reels; a capstan positioned on said spindle intermediate said takeup reel and said turntable; means to drive said capstan by said turntable; frictional engagement means to drive said takeup reel by said capstan; a recording head positioned adjacent the peripheries of said reels; a multiple surface guide member, said capstan being adapted to progressively withdraw magnetic recording material from said stock reel, over said guide member and said recording head, said capstan being adapted to frictionally drive said takeup reel to withdraw said recording material from said capstan; means to maintain said magnetic recording material in frictional driven contact with said capstan; and roller guide means intermediate said capstan and said takeup reel.

12. In a magnetic recording and transcribing device, the combination of: a turntable; means to drive said turntable; a spindle disposed axially from said turntable; a cylindrical capstan mounted on said spindle in engagement with said turntable and adapted to be driven by said turntable; a takeup reel disposed on said spindle in engagement with said capstan; frictional engagement driving means between said capstan and said takeup real; a stock reel disposed on said spindle adjacent said takeup reel; a spacer disposed intermediate said takeup and stock reels; a frame structure surrounding said turntable; a magnetic recording head mounted on said frame structure adjacent the peripheries of said reels; a level changing guide member mounted on said frame structure adjacent said recording head; a guide roller mounted on said frame structure; a pressure arm pivotally supported on said frame structure; an end portion on said pressure arm, said end portion being adapted for engagement with a peripheral surface of said capstan; and means to urge said portion of said pressure arm into engagement with said capstan whereby a recording medium is transported from said stock reel by action of said capstan in transmitting motive power to said recording medium in passage intermediate said pressure member and said capstan, said recording medium being adapted to be progressively drawn outwardly from said stock reel, downwardly over said guide member to the level of said capstan, over said recording head, about and driven by said capstan and said guide roller, to be thereafter wound on said takeup reel.

13. In a magnetic recording and transcribing device, the combination of: a turntable; means to drive said turntable; a fixed spindle disposed axially from said turntable; a cylindrical capstan mounted on said spindle in engagement with said turntable and adapted to be driven by said turntable; a takeup reel disposed on said spindle in engagement with said capstan; a frictional surface on said capstan whereby to drive said takeup reel; a stock reel disposed on said spindle adjacent to and in axial alignment with said takeup reel; a friction reducing spacer disposed intermediate said takeup and stock reel, said reels being adapted for counter rotation about said spacer; a frame structure surrounding said turntable; a combination magnetic recording playback and erase head mounted on said frame structure adjacent the peripheries of said reels; a level changing guide member mounted on said frame structure adjacent said head; a guide roller mounted on said frame structure; a pressure arm pivotally supported on said frame structure; an end portion on said pressure arm, said end portion being adapted for engagement with a peripheral surface of said capstan; and means to urge said portion of said pressure arm into engagement with said capstan whereby a recording medium is transported from said stock reel by action of said capstan in transmitting motive power to said recording medium in passage intermediate said pressure member and said capstan, said recording medium being adapted to be progressively drawn outwardly from said stock reel, downwardly over said guide member to the level of said capstan, over said head, about and driven by said capstan and said guide roller, to be thereafter wound on said takeup reel.

14. A recording medium reeling mechanism comprising, in combination: a common spindle; a capstan mounted on said spindle; means to rotate said capstan; a pair of reels rotatably disposed on said spindle; a frictional driving surface carried by said capstan, one of said reels being disposed in engagement with said surface and adapted to be frictionally driven by said capstan; a friction disc disposed on said spindle between said one and the other of said reels; a supply of recording medium wound about said the other of said reels; and a multiple element recording medium guide means remote from the peripheries of said reels, said recording medium being adapted, upon rotation of said spindle, to be withdrawn from said the other of said reels, pass about one element of said guide means and about and driven by said capstan, pass about another element of said guide means and be wound on said one of said reels.

15. A recording medium reeling mechanism according to claim 14 wherein said one element of said guide means comprises a plurality of surfaces over which the recording medium is adapted to pass by driving action of said capstan in order that the vertical level thereof may be changed.

16. A recording medium reeling mechanism according to claim 14 wherein said recording medium derives its motive force for movement from one reel to another in response to passage about said capstan.

17. A recording medium reeling mechanism according to claim 16 wherein a pressure roller is provided to insure constant pressure of said recording medium on said capstan.

References Cited in the file of this patent

UNITED STATES PATENTS

| | | |
|---|---|---|
| 2,490,771 | Begun | Dec. 13, 1949 |
| 2,507,385 | Shrader | May 9, 1950 |
| 2,526,051 | Shrader | Oct. 17, 1950 |
| 2,632,060 | Foote et al. | Mar. 17, 1953 |
| 2,706,638 | Bruderlin | Apr. 19, 1955 |

FOREIGN PATENTS

| | | |
|---|---|---|
| 618,147 | Germany | Sept. 2, 1935 |